United States Patent
Ferreri et al.

(10) Patent No.: US 10,009,514 B2
(45) Date of Patent: Jun. 26, 2018

(54) MECHANISM TO PERFORM FORCE-X COLOR MANAGEMENT MAPPING

(71) Applicants: Vincent William Ferreri, Frederick, CO (US); Larry M. Ernst, Longmont, CO (US)

(72) Inventors: Vincent William Ferreri, Frederick, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/232,968

(22) Filed: Aug. 10, 2016

(65) Prior Publication Data

US 2018/0048787 A1 Feb. 15, 2018

(51) Int. Cl.
*H04N 1/60* (2006.01)
*G06K 15/02* (2006.01)
*H04N 1/405* (2006.01)
*H04N 1/52* (2006.01)

(52) U.S. Cl.
CPC ....... *H04N 1/6025* (2013.01); *G06K 15/1878* (2013.01); *H04N 1/6008* (2013.01); *H04N 1/6027* (2013.01); *G06K 15/1881* (2013.01); *H04N 1/405* (2013.01); *H04N 1/52* (2013.01); *H04N 2201/0082* (2013.01)

(58) Field of Classification Search
CPC .............. H04N 1/56; H04N 1/58; H04N 1/6016–1/6025; H04N 1/3935; H04N 1/40068; G06K 15/1873; G06K 15/1878
See application file for complete search history.

(56) References Cited

U.S. PATENT DOCUMENTS

| | | | |
|---|---|---|---|
| 4,887,150 A | 12/1989 | Chiba et al. | |
| 6,362,808 B1 * | 3/2002 | Edge | H04N 1/6058 345/418 |
| 6,778,300 B1 * | 8/2004 | Kohler | H04N 1/6022 358/1.9 |
| 6,873,434 B1 | 3/2005 | Kohler et al. | |
| 7,046,393 B2 | 5/2006 | Zeng | |
| 7,250,956 B2 * | 7/2007 | Sawada | H04N 1/603 345/601 |
| 7,307,753 B2 | 12/2007 | Sasaki et al. | |
| 7,443,544 B2 * | 10/2008 | Waksman | H04N 1/6016 358/3.01 |
| 7,564,466 B2 * | 7/2009 | Quach | G06F 3/13 345/471 |
| 7,573,612 B2 * | 8/2009 | Suzuki | H04N 1/6025 358/1.9 |
| 7,586,643 B2 | 9/2009 | Higashikata | |

(Continued)

FOREIGN PATENT DOCUMENTS

| | | |
|---|---|---|
| JP | 4010959 | 1/1992 |
| JP | 4346571 | 12/1992 |
| JP | 8010902 | 4/2016 |

*Primary Examiner* — Scott A Rogers
(74) *Attorney, Agent, or Firm* — Jaffery Watson Mendonsa & Hamilton LLC (57) ABSTRACT

A printing system is disclosed. The printing system includes a color management unit having a common color engine (CCE) to map input colors matching one of more criteria into output colors having a single color component to generate Preserve-X colors and a color cache to store the Preserve-X colors. The Preserve-X colors include the corresponding pairs of input colors and output colors.

18 Claims, 7 Drawing Sheets

(56) References Cited

U.S. PATENT DOCUMENTS

| | | | |
|---|---|---|---|
| 7,859,722 B1 | 12/2010 | Kulkarni | |
| 7,995,237 B2 | 8/2011 | Haikin et al. | |
| 8,102,569 B1* | 1/2012 | Goel | H04N 1/6058 |
| | | | 358/2.1 |
| 8,131,070 B2 | 3/2012 | Sasaki | |
| 8,416,459 B2* | 4/2013 | Ito | H04N 1/6019 |
| | | | 358/1.9 |
| 8,582,188 B2 | 11/2013 | Sanchez et al. | |
| 8,593,693 B2* | 11/2013 | Qiao | H04N 1/603 |
| | | | 358/1.16 |
| 8,605,329 B2 | 12/2013 | Shestak et al. | |
| 8,767,258 B2 | 7/2014 | Shestak et al. | |
| 9,742,959 B1* | 8/2017 | Kailey | G06K 15/1802 |
| 2005/0122532 A1* | 6/2005 | Chang | H04N 1/6022 |
| | | | 358/1.9 |
| 2007/0188814 A1* | 8/2007 | Walton | H04N 1/40 |
| | | | 358/3.23 |
| 2007/0206850 A1* | 9/2007 | Lin | H04N 1/6016 |
| | | | 382/162 |
| 2008/0025602 A1* | 1/2008 | Won | H04N 1/60 |
| | | | 382/167 |
| 2010/0053653 A1* | 3/2010 | Hatori | H04N 1/6033 |
| | | | 358/1.9 |
| 2010/0182659 A1* | 7/2010 | Ochs | H04N 1/54 |
| | | | 358/515 |
| 2011/0109943 A1* | 5/2011 | Qiao | H04N 1/6025 |
| | | | 358/3.23 |

\* cited by examiner

```
// Default cache size:
cacheSize = X;
// Detect if Preserve-K is set and how many elements we expect it to
// impact. Then just add that much to the cache size so that the
// effective number of elements we can store in the cache is unchanged
if( preserveK )
{
nPreserveK = 255; // hard-code or compute the expected number of
// elements. This may include a tolerance or
// threshold
cacheSize += nPreserveK;
}
// Construct the cache. Note that the cache size must be a prime, but
// we assume that the constructor can take care of this for us
cache = createCache( cacheSize );
// Add any overrides that we might want to trump the Preserve-K
// setting. This might be color substitutions or other things. Since
// we add them first, the will be found first and thus will not
// conflict with any other overrides which might be set latter.
cache.addOverides( ... )
// Add the Preserve-K colors to the cache. The implementation of this
// will vary on a case-by-case basis and is heavily dependant on the
// input color space. It may also be a function of any tolerance or
// threshold that is set, but one embodiment of it (for RGB) might be:
//
// This part can be easily modified or expanded upon to crate the
// Preserve-X colors
for( i = 0; i < 255; i++ )
{
inColor = ( i, i, i );
outColor = ( 0, 0, 0, i );
cache.addColor( inColor, outColor );
}
// When done adding all override colors, we need to save the state of
// cache. After this, when cache.reset() is called, it will return to
// the current state that the cache is in now
cache.saveState();
```

MECHANISM TO PERFORM FORCE-X COLOR MANAGEMENT MAPPING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the field of color management, and in particular, to mapping pure input colors via color management to true output colors.

BACKGROUND

Growth in color management has resulted in an increase in software packages that are used to generate International Color Consortium (ICC) profiles. ICC profiles describe color attributes of a particular device or viewing requirement by defining mappings between a device color space and device independent color space. Typically, profiles created by a standard organization, e.g., International Organization for Standardization (ISO) are selected as printer input profiles when printing cyan, magenta, yellow, black (CMYK) print jobs.

Color management typically performs a multi-dimensional interpolation of an input color within a high-dimensional Look Up Table (LUT). In commercial and transactional printers it is common to apply a Preserve-Black (Preserve-K) transformation to colors in order to produce more desirable color output. Most commonly this transformation is used for gray text, where it is desired to preserve the "grayness" through color management and not introduce non-gray values into the output. Additionally, ink/toner usage can be minimized through this transformation because true grays can be produced through the K channel alone, with no C, M, or Y ink/toner being used.

The transformation effectively maps input colors with an equal magnitude of each constituent color component into a single gray/black output color component. For example an RGB value with r=g=b color components would be mapped to an output CMYK color of c=m=y=0, k'. Likewise, an input CMYK value of c=m=y, k=0 or C=M=Y=0, k' would be mapped to c=m=y=0, k'. This transformation is performed to insure that colors that represent a true gray/black are preserved as an equally true gray/black even after any other color management is applied.

A common method for obtaining Preserve-K colors is to modify the LUT from which all colors are interpolated. Essentially, all LUT nodes matching the input criteria for a Preserve-K color are manually modified to insure that the output color is K-only, regardless of the original output color values in the LUT. For example, an RGB LUT would have all of its nodes with input color (x, x, x) mapped to an output CMYK color of (0, 0, 0, k'). The value of k' is dependent on the input color space itself and various formulas/expressions may be used.

While this design provides a fast/efficient solution to the Preserve-K problem, it can lead to color artifacts and the contamination of colors. Modifications to the LUT can produce far-reaching color changes in the areas near the modified nodes. Colors that are themselves not actually Preserve-K may be heavily influenced by a nearby Preserve-K color. Alternatively, true Preserve-K colors may still not be obtained in all cases (namely for RGB input spaces) because the K-axis is not a principal component of the color space.

Accordingly, a mechanism to perform Preserve-X transformations is desired.

SUMMARY

In one embodiment, a printing system is disclosed. The printing system includes a color management unit having a common color engine (CCE) to map input colors matching one or more criteria into output colors having a single color component to generate Preserve-X colors and a color cache to store the Preserve-X colors. The Preserve-X colors include the corresponding pairs of input colors and output colors.

In a further embodiment, a method is disclosed including mapping input colors matching one or more criteria into output colors having a single color component to generate Preserve-X colors and storing the Preserve-X colors in a color cache. The Preserve-X colors include the corresponding pairs of input colors and output colors.

BRIEF DESCRIPTION OF THE DRAWINGS

A better understanding of the present invention can be obtained from the following detailed description in conjunction with the following drawings, in which.

DETAILED DESCRIPTION

A mechanism to perform Preserve-X transformations is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
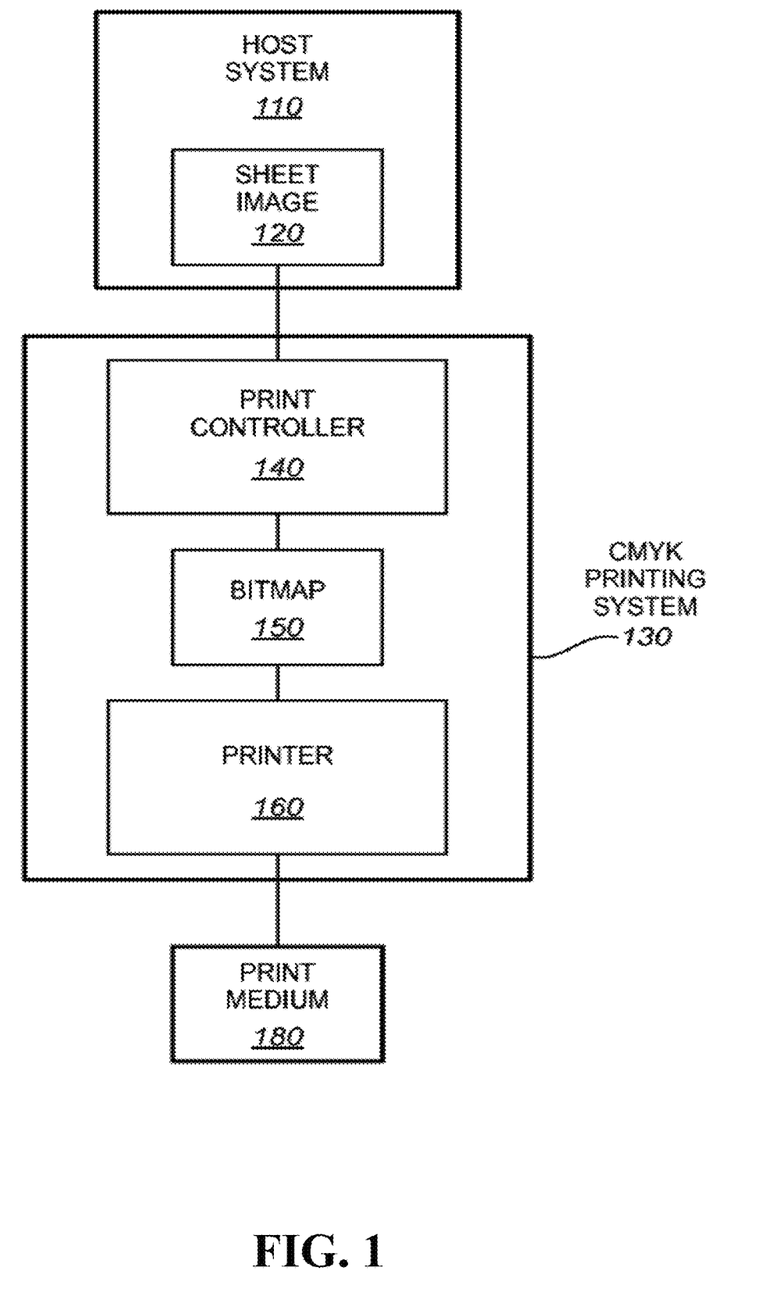
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
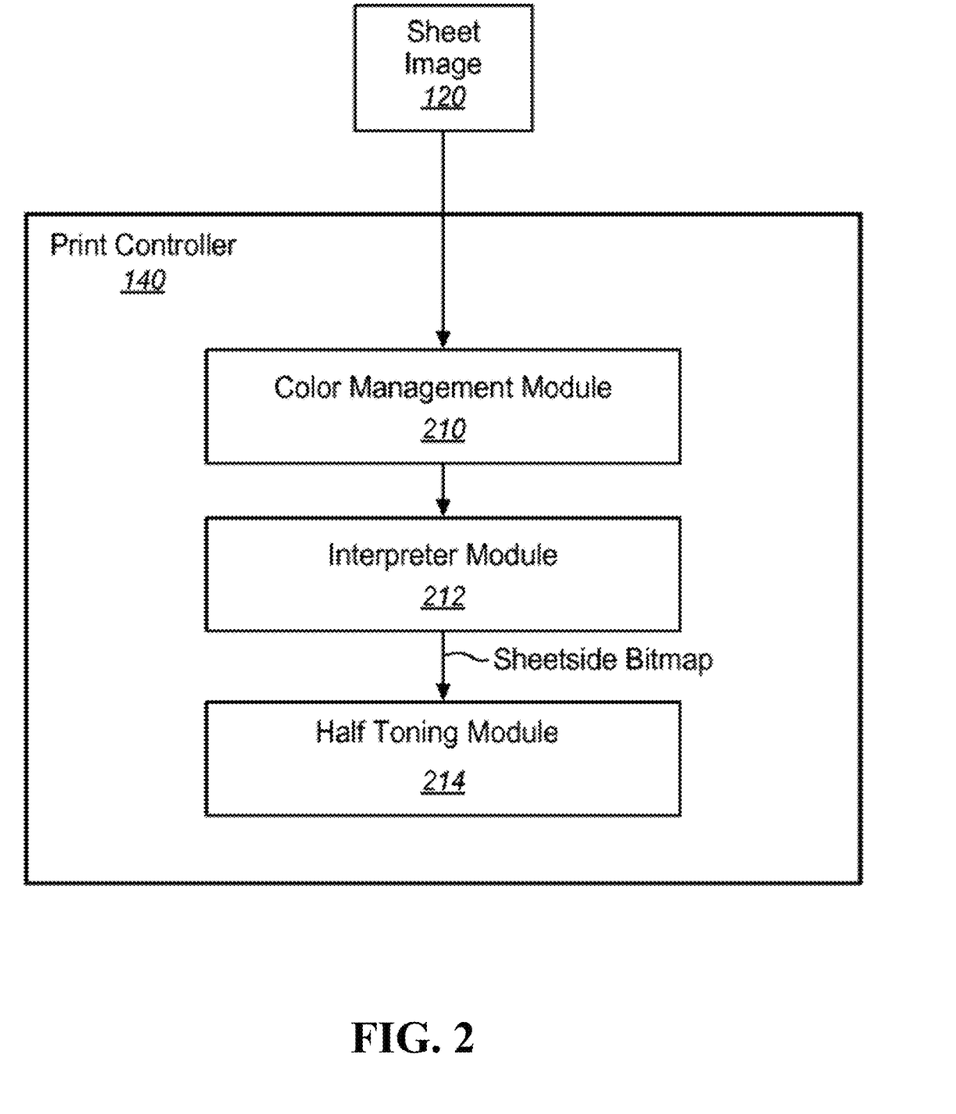
FIG. 2 is a block diagram of one embodiment of a print controller.

FIG. 2 is a block diagram illustrating one embodiment of a print controller 140. The print controller 140 (e.g., DFE or digital front end), in its generalized form, includes color management module 210, interpreter module 212 and halftoning module 214. Color management module 210 provides a color mapping from an input color space to a printer 160 color space.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (i.e., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. Thus, halftoning module 214 converts a contone image to a binary/multi-bit level image at the same dots per inch (dpi) as the full sheetside bitmap. This is due to halftoning, which is typically implemented as a point operation creating a one to one correspondence of the contone pixels and the halftoned image pixels. The resulting halftoned image is used to drive a printhead mechanism of the printer 160.

Figure 3:
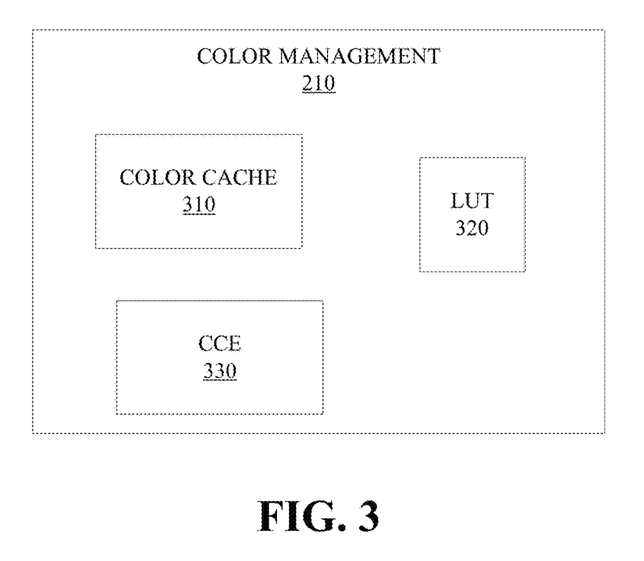
FIG. 3 illustrates one embodiment of a color management unit.

In one embodiment, color management unit 210 uses ICC profiles to perform a color managed workflow by mapping to determine CMYK values for each pixel in a particular object to be printed at printer 160. FIG. 3 is a block diagram illustrating one embodiment of a color management unit 210. Color management unit 210 includes a color cache 310, and color lookup table (LUT) 320. Color cache 310 may be hardware and/or software components that store color mapping data so that future requests for that data can be served faster.

In one embodiment, print controller 140 performs a lookup of color cache 310 upon receiving an input color to determine if the input color is included in color cache 310 with a corresponding output color. If so, the output color is provided for the color management workflow. However, if there is no entry in color cache 310, LUT 320 is utilized to perform a multi-dimensional interpolation in order to generate the output color. Thus, the input color and the resulting output color are stored as an entry in color cache 310.

Figure 4A:
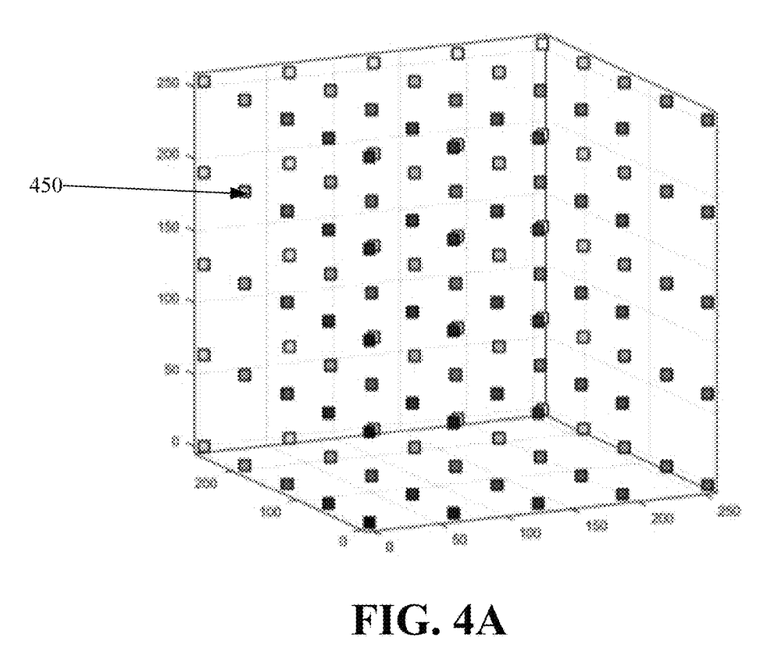
FIGS. 4A & 4B illustrate LUT embodiments.

FIG. 4A illustrates one embodiment of LUT 320. As shown in FIG. 4A, LUT 320 includes a plurality of nodes 450. As previously mentioned a LUT, such as LUT 320, is modified to obtain Preserve-K colors by manually modifying LUT nodes 450 matching an input criteria for a Preserve-K color in order to insure that the output color is K-only. However, such node modification may lead to color artifacts and the contamination of colors, as discussed above.

A solution to the problem has been to add LUT nodes. However this solution results in a cost of greatly increasing the LUT size. Furthermore, the solution still may not produce the exact Preserve-K values for all colors that should be Preserve-K. Another solution is to check each color for Preserve-K explicitly. This solution will produce exact Preserve-K colors in all cases, but comes at the extreme cost of always having to check each/every color component of a given input color.

According to one embodiment, color management unit 210 is implemented to perform a mapping of input colors matching one of several criteria into an output color having a single color component (e.g., Preserve-X, where X may represent any primary color or combination thereof). Specifically, color management unit 210 performs a Preserve-K mapping of input colors matching an equal magnitude of each constituent color component into a single gray/black output color component.

Another criterion is the mapping of a single designated input color component with remaining color components equal to zero into a single output color component (e.g. gray/black for Preserve-K). An alternate criterion is the mapping of one of more input colors with unique properties a printer operator may desire to a single output color component (e.g. gray/black for Preserve-K).

Figure 4B:
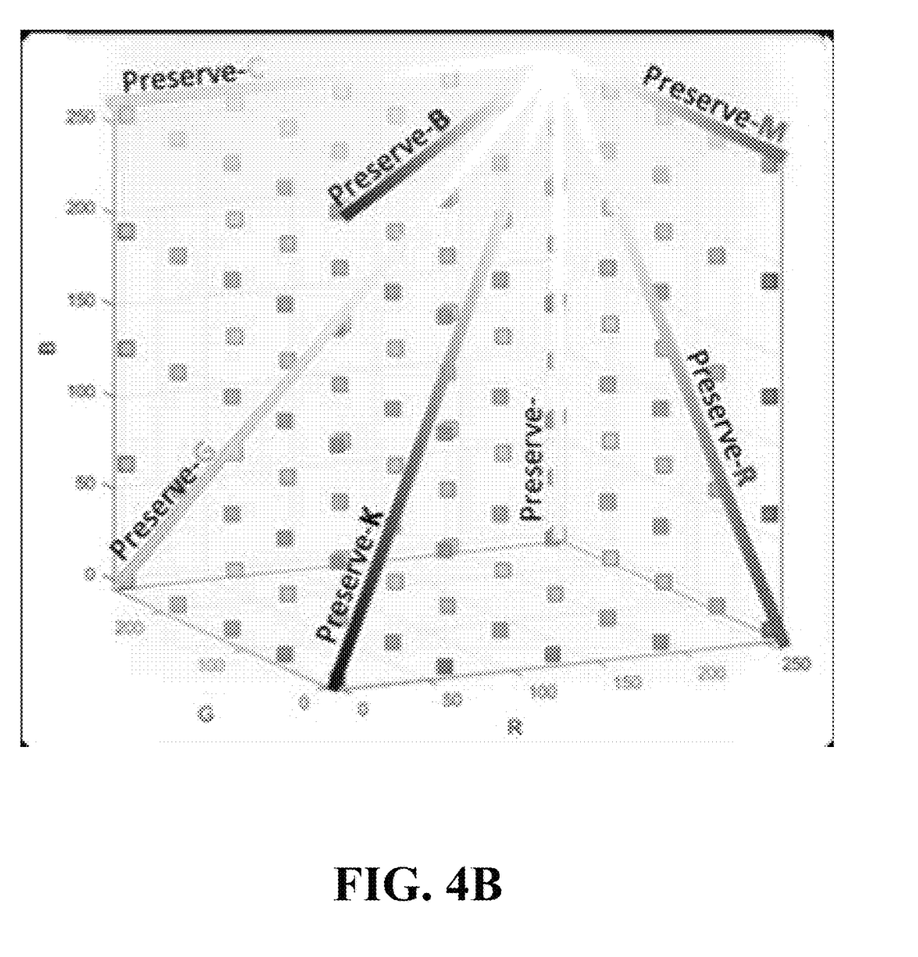

Further embodiments may implement other color mappings. For example, there may be an instance in which a Y-component of an input CMYK color may need to be preserved through color management into a different output CMYK color space. In such an instance, the desired behavior is realized by adding all Preserve-X colors to color cache 310. FIG. 4B illustrates one embodiment of Preserve-X colors for various X color component values in LUT 320 for an RGB input color space. In a further embodiment, tolerances may be used on the Preserve-X colors. For instance, in a RGB Preserve-K embodiment, all colors of the form (x+/−1, x+/−1, x+/−1) may also be preserved.

In one embodiment, color management unit 210 includes a common color engine (CCE) 330 that pre-computes a mapping of the Preserve-X input colors into the Preserve-X output color, and stores the Preserve-X input and output pair colors in color cache 310. In such an embodiment, LUT 320 remains unmodified. The Preserve-X input colors may be determined a priori when the input color space is known (e.g., for the RGB color space, Preserve-K colors are of the form R=G=B).

Upon receiving an input color, CCE 330 performs a search of color cache 310 for the presence of the color (e.g., either as a Preserve-X color or as a previously interpolated color). If the input color is found in cache 310, the corresponding output color is returned and nothing more is needed. However, if the input color is not found in color cache 310, LUT 320 is implemented to perform a full multi-dimensional interpolation to compute the output color. This output color is then stored in the color cache 310 for later use, and then returned. Accordingly, Preserve-X colors are obtained by circumventing LUT 320 interpolation.

Figure 5:
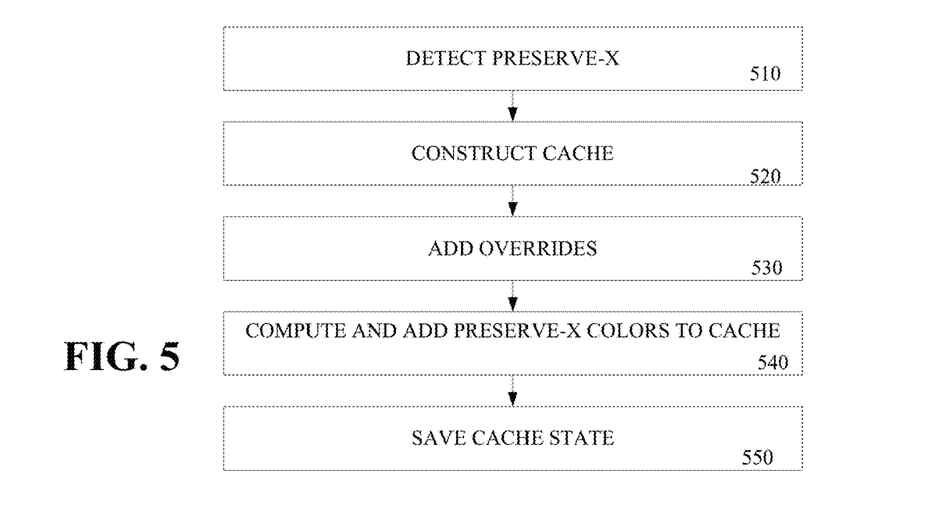
FIG. 5 is a flow diagram illustrating one embodiment of a process to generate a cache for Preserve-K implementation.

FIG. 5 is a flow diagram illustrating one embodiment of a cache generation process. At processing block 510, there is a determination as to whether a Preserve-X mode is set and a number of Preserve-X elements that are expected to be impacted. Preserve-X mode may be set by an operator through a GUI (i.e. Graphical User Interface using cursor control 922, keyboard 923 and/or display 924) or set as indicated by the received print job and/or job ticket. If Preserve-X is set, the original cache 310 size is increased by a number commensurate with the number of Preserve-X elements. At processing block 520, color cache 310 is constructed. In one embodiment the size of cache 310 is prime and the cache 310 type is a hash table.

Figure 6:
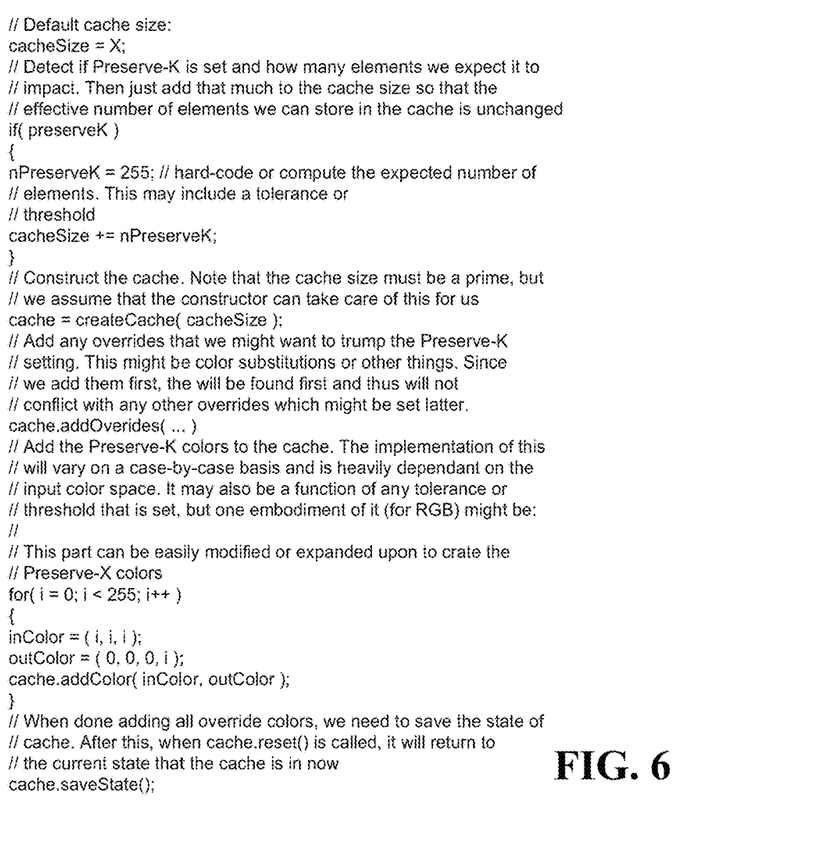
FIG. 6 illustrates one embodiment of code implemented to generate a cache for Preserve-K implementation.
Figure 7:
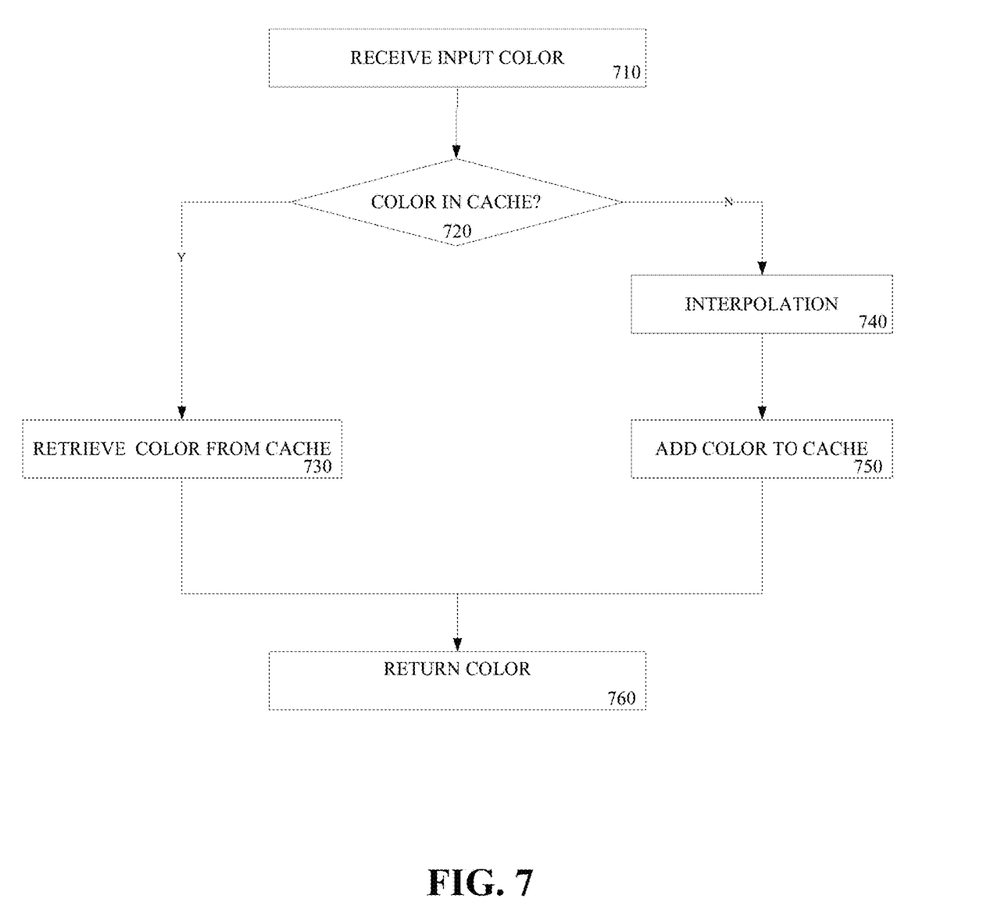
FIG. 7 is a flow diagram illustrating one embodiment for performing a Preserve-K process.

At processing block 530, overrides are inserted. In one embodiment, the overrides are implemented to override the Preserve-X colors. In one embodiment, the override may include color substitutions. At processing block 540, the Preserve-X colors are computed and inserted into cache 310. At processing block 550, the cache 310 state is saved. FIG. 6 illustrates one embodiment of code implemented to generate a cache for Preserve-X implementation;

FIG. 7 is a flow diagram illustrating one embodiment for performing a Preserve-X process. At processing block 710, an input color is received at color management unit 210. At decision block 720, a determination is made as to whether an input color is in color cache 310. If so, an output color corresponding to the input color is retrieved from color cache 310, processing block 730. As discussed above, the retrieved color may be a Preserve-X color, or a color that has previously been interpolated. At processing block 760, the output color is returned.

If at decision block 720, a determination is made that the input color is not in cache 310, a multi-dimensional interpolation is performed at LUT 320, processing block 740. At processing block 750, the new input and output colors are added to color cache 310. At processing block 760, the output color is returned.

Within the course of processing millions (or billions) of input colors, it typically becomes necessary to clear/reset the color cache 310. In one embodiment, color cache 310 may be reset without actually removing all of the included colors. In this way, only the colors that were interpolated may be reset, while the Preserve-X colors and/or override colors will not need to be recomputed and/or reinserted into the color cache 310.

The above-described mechanism provides Preserve-X colors at little-to-no additional computational cost. This is especially true for RGB colors, which traditionally suffer from an inability to exactly compute all Preserve-X colors when using LUTs with modified nodes. The time it takes to add Preserve-X colors to the color-cache initially is just a one-time computational expense. Additionally, this processing time is likely comparable to the time it currently takes to modify the Preserve-X LUT nodes. Since the LUT nodes are now never modified, there is no corruption of any non-Preserve-X color.

Additionally, the above-described mechanism enables higher processing speeds since all Preserve-X colors are computed only once, rather than having to be recomputed/re-interpolated every time the color-cache is reset. As discussed above, only colors from interpolations are erased during cache resets, while Preserve-X colors and/or override colors are maintained.

Figure 8:
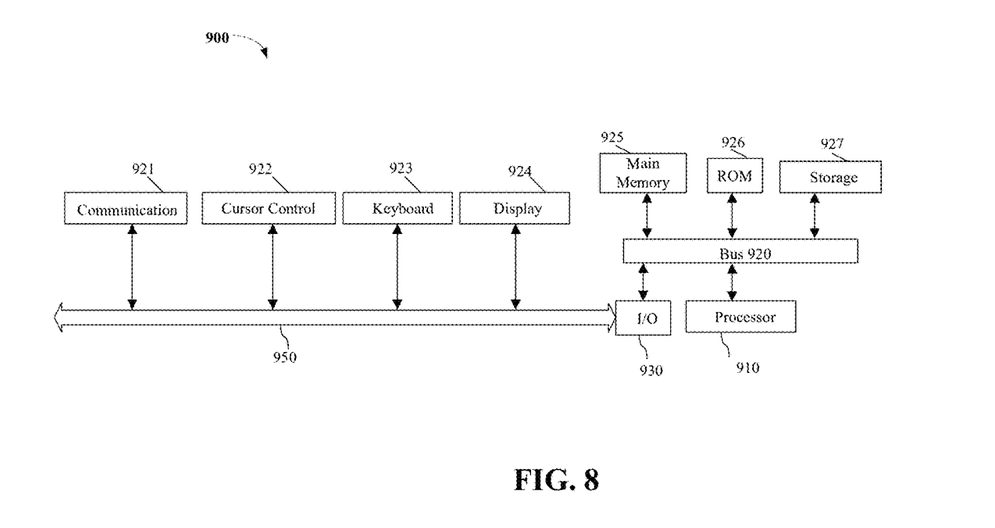
FIG. 8 illustrates one embodiment of a computer system.

FIG. 8 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   a memory to store:
      a common color engine (CCE); and
      a color cache to store Preserve-X colors; and
   a processor to receive a print job, perform color management on the print job, including executing the CCE to pre-compute the Preserve-X colors, determine a number of Preserve-X pairs that are to be added to the color cache upon a determination that a Preserve-X mode is set and map input colors in a first color space matching one or more criteria into output colors in a second color space having a single non-zero color component to generate the Preserve-X colors, wherein the Preserve-X colors comprise pairs of corresponding input colors and output colors that are mapped to each other, and transmitting the print job for printing.

2. The printing system of claim 1, wherein the CCE inserts the Preserve-X colors into the color cache.

3. The printing system of claim 2, wherein the CCE inserts override color substitutions to override Preserve-X colors.

4. The printing system of claim 2, further comprising a lookup table (LUT) to generate output colors corresponding to input colors received at the color management unit.

5. The printing system of claim 2, wherein the CCE retrieves an output color from the color cache upon a determination that the input color has been previously added to the cache.

6. The printing system of claim 5, wherein the input color is a Preserve-X input color.

7. The printing system of claim 4, wherein the processor performs a multi-dimensional interpolation to generate an output color upon a determination that the input color is not included in the color cache.

8. The printing system of claim 7, wherein the output color retrieved from the color cache is a previously interpolated color.

9. A non-transitory machine-readable medium including data that, when accessed by a machine, cause the machine to:
   receive a print job;
   perform color management on the print job to:
      pre-compute the Preserve-X colors, determine a number of Preserve-X pairs that are to be added to the color cache upon a determination that a Preserve-X mode is set and map input colors in a first color space matching one or more criteria into output colors in a second color space having a single non-zero color component to generate the Preserve-X colors, wherein the Preserve-X colors comprise pairs of corresponding input colors and output colors that are mapped to each other; and
      store the Preserve-X colors in a color cache; and
   transmit the print job for printing.

10. The machine-readable medium of claim 9, including data that, when accessed by a machine, further cause the machine to:
   insert the Preserve-X colors into the color cache.

11. The machine-readable medium of claim 10, including data that, when accessed by a machine, further cause the machine to insert override color substitutions to override Preserve-X colors.

12. The machine-readable medium of claim 10, including data that, when accessed by a machine, further cause the machine to generate output colors corresponding to received input colors.

13. The machine-readable medium of claim 10, including data that, when accessed by a machine, further cause the machine to retrieve an output color from the color cache upon a determination that the input color has been previously added to the cache.

14. The machine-readable medium of claim 13, wherein the input color is a Preserve-X input color.

15. The machine-readable medium of claim 13, including data that, when accessed by a machine, further cause the machine to perform a multi-dimensional interpolation to generate an output color upon a determination that the input color is not included in the color cache.

16. A print controller, comprising:
   a memory to store a color management unit, including;
      a common color engine (CCE); and
      a color cache to store Preserve-X colors; and
   a processor to receive a print job, perform color management on the print job via the color management unit, including executing the CCE to pre-compute the Preserve-X colors, determine a number of Preserve-X pairs that are to be added to the color cache upon a determination that a Preserve-X mode is set and map input colors in a first color space matching one or more criteria into output colors in a second color space having a single non-zero color component to generate the Preserve-X colors, wherein the Preserve-X colors comprise pairs of corresponding input colors and output colors that are mapped to each other, and transmitting the print job for printing.

17. The color management unit of claim 16, wherein the CCE inserts the Preserve-X colors into the color cache.

18. The color management unit of claim 16, wherein the CCE pre-computes the Preserve-X colors given a tolerance on the input colors and inserts these Preserve-X colors into the color cache.

* * * * *